Aug. 15, 1950 M. H. TUFT 2,518,732
GATHERER FOR CORN HARVESTERS
Filed Sept. 25, 1944 2 Sheets-Sheet 1

INVENTOR.
MILES H. TUFT

ATTORNEYS

WITNESS

Aug. 15, 1950 — M. H. TUFT — 2,518,732
GATHERER FOR CORN HARVESTERS
Filed Sept. 25, 1944 — 2 Sheets-Sheet 2
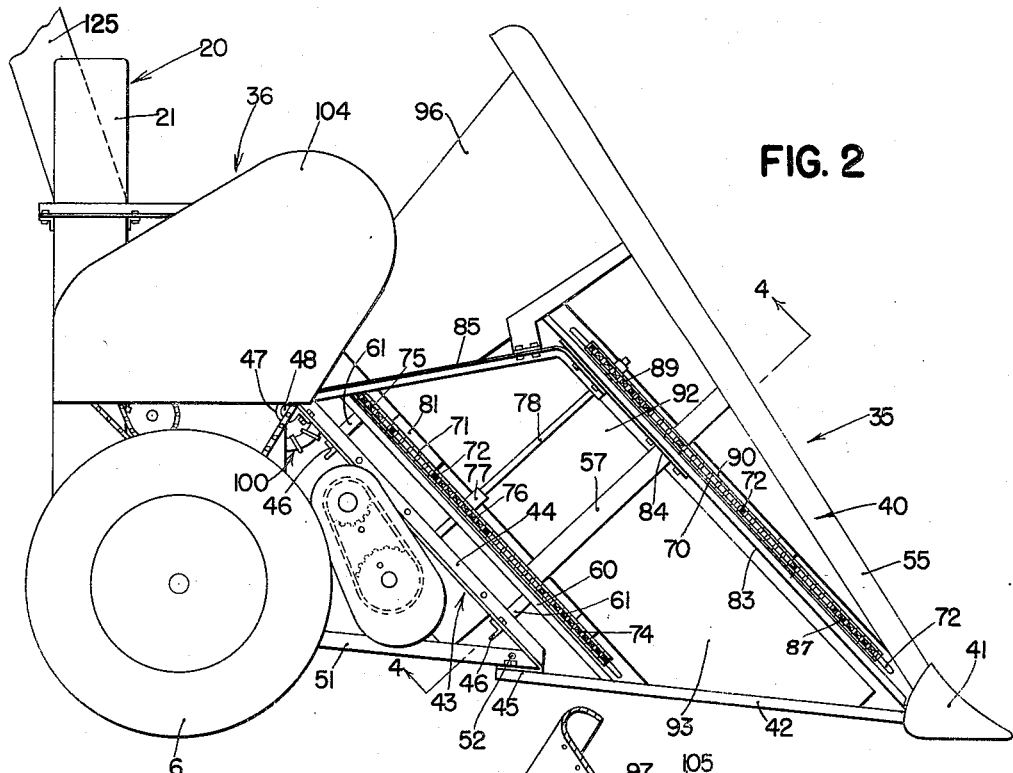
FIG. 2
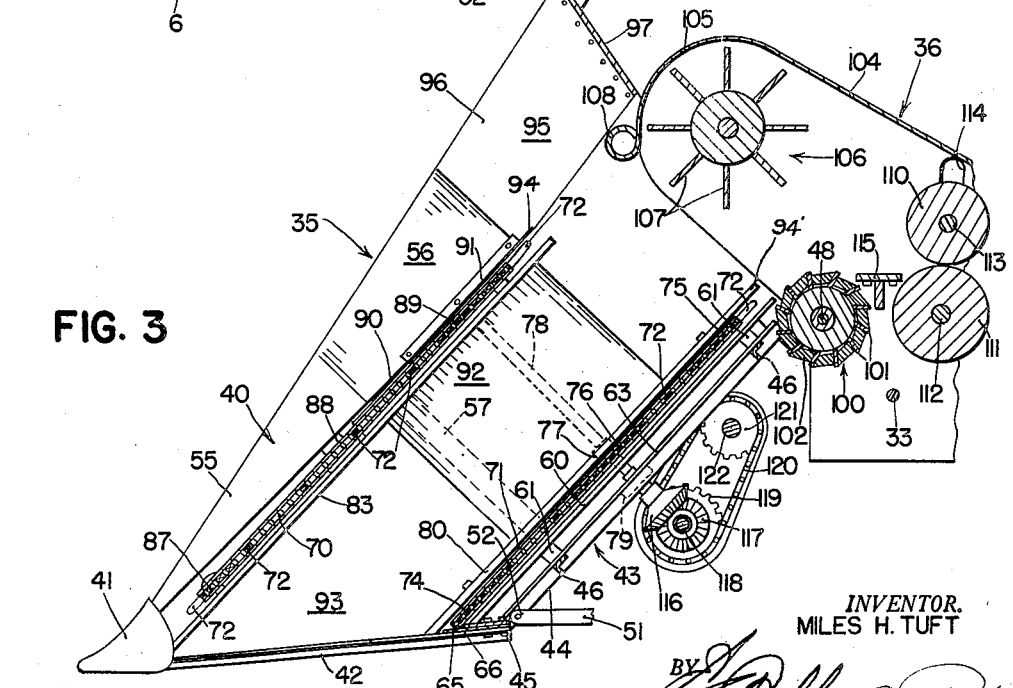
FIG. 3
*INVENTOR.*
MILES H. TUFT
ATTORNEYS
WITNESS
E. B. Bjurstrom Patented Aug. 15, 1950

2,518,732

UNITED STATES PATENT OFFICE 2,518,732

GATHERER FOR CORN HARVESTERS

Miles H. Tuft, Lancaster, Calif., assignor to Deere Manufacturing Co., a corporation of Iowa Application September 25, 1944, Serial No. 555,716

3 Claims. (Cl. 56—16)

The present invention relates generally to corn harvesters and more particularly to the class of corn harvesters in which the stalks are severed from the ground and are gathered rearwardly and delivered rearwardly to a crop treating mechanism, such as a rotary chopper or the like. The principal object of this invention has to do with the provision of a novel and improved harvesting mechanism for gathering and delivering the stalks, and which more efficiently handles the severed stalks for feeding into the crop treating mechanism. A further object has to do with the provision of a corn harvesting mechanism which is simpler and lighter in construction than those heretofore known to those skilled in the art, but is more efficient in operation and is less subject to clogging by stalks, weeds, etc.

Heretofore, stalk gathering mechanisms of conventional types have included an inclined stalk passage through which the severed stalks were delivered to the crop treating mechanism, with gathering chains disposed to travel rearwardly along the walls of the passage, but in order to properly support the stalks during delivery through the passage, the side walls were necessarily spaced rather closely together. This resulted in the ears and foliage of the corn being more or less congested within the passage, so that in those machines where the stalks are fed lengthwise into a crop treating mechanism such as a rotary chopper, the ears and foliage of the various stalks interfered with the ears and foliage of other stalks to the extent that under heavy crop conditions the feeding of the stalks was impeded. It is a more specific object of the present invention, therefore, to provide a corn harvesting and gathering device in which the stalk passage provides ample room for receiving the ears and foliage of the plants during delivery of the stalks, but without sacrifice in the control and support of the stalks during delivery.

These and other objects and advantages of my invention will be apparent to those skilled in the art after a consideration of the following description, in which reference is had to the drawings appended hereto, in which:

Figure 2 is a side elevational view of the machine as viewed from the right-hand side of the latter.

Figure 3 is a longitudinal sectional elevation taken along a line 3—3 in Figure 1.

Figures 1, 4:
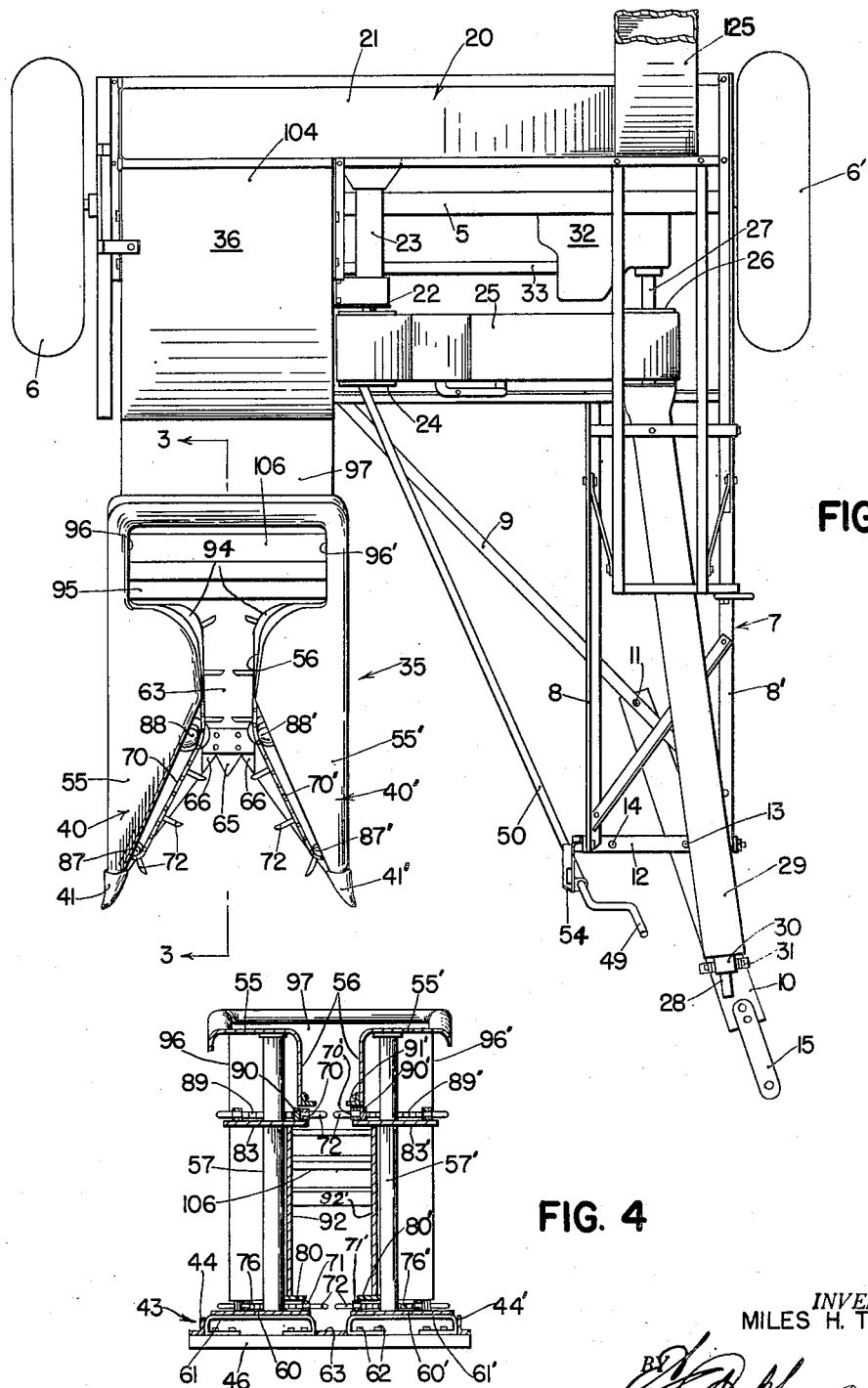
Figure 1 is a plan view of a corn harvesting machine for harvesting and chopping cornstalks into ensilage.
Figure 4 is a transverse sectional elevation taken through the gathering mechanism along the line 4—4 in Figure 2.

Referring now to the drawings, the corn harvester comprises a supporting frame including a transversely disposed beam 5 supported on a pair of laterally spaced ground wheels 6, 6' journaled at opposite ends, respectively, of the beam 5, and a forwardly extending draft frame 7 including a pair of laterally spaced, longitudinally extending members 8, 8' and an obliquely disposed bracing member 9 connected at its rear end to the main beam 5 and at its forward end to the longitudinally extending members 8, 8'. A laterally swingable draft tongue 10 is pivotally connected at 11 to the oblique member 9 and extends forwardly beneath a transverse tie member 12 connecting the forward ends of the longitudinal members 8, 8'. The draft tongue 10 is detachably connected by a bolt 13 to the transverse member 12 and is provided with a hitch member 15 adapted to be pivotally connected to the drawbar of a tractor or other suitable draft device, to position the harvester in offset relation to the tractor during operation in the field. For purposes of transporting the machine to and from the field through narrow gates, the draft tongue 10 can be disconnected from the transverse member 12 by removing the bolt 13, after which the tongue can be swung inwardly and connected to the inner end of the transverse member 12 by inserting the bolt 13 through a hole 14 to position the implement directly behind the tractor, as is well-known to those skilled in the art.

A flywheel type of rotary chopper, indicated generally by reference numeral 20, is disposed transversely behind the main beam 5 and is carried thereon, and comprises a circular housing 21, within which is mounted a chopping rotor (not shown), rotatable in a vertical plane about a fore and aft extending axis. The chopping rotor is mounted on a drive shaft 22 which is supported in a bearing housing 23 and carries a pulley 24 at its forward end. The pulley 24 is driven through a flat drive belt 25, which is trained over a drive pulley 26 mounted on a power shaft 27, the latter receiving power from the tractor engine through a flexible power transmitting connection including a shaft 28 extending forwardly from the pulley 26 and enclosed in a safety shield 29. The forward end of the shaft 28 is journaled in a bearing 30 carried on a bracket 31 which is mounted on the draft tongue 10 and the forward end of the shaft 28 is splined to receive a power transmitting connection (not shown) which connects to the power take-off shaft of the tractor in a manner well-known to those skilled in the art. The rear end of the power shaft 27 is supported in a gear box 32 containing gears (not shown) for driving a transverse power shaft 33 which extends laterally and furnishes power for the harvesting and gathering unit, indicated generally by reference numeral 35, and also for the feeding mechanism, indicated generally by reference numeral 36, which feeds the harvested stalks to the chopper 20.

The implement so far described, is substantially the same as that disclosed and claimed in Patent 2,347,907, granted May 2, 1944, to Hill. Since the Hill patent describes a machine of this type in detail, it is not considered necessary to repeat the description here, since the present invention is not concerned directly with the general details of construction of the harvester frame or with its chopping mechanism.

Coming now to that part of the structure with which the invention is more directly concerned, the harvesting unit 35 comprises a pair of gatherers 40, 40' the forward ends of which carry divider points 41, 41' which are adapted to travel along the ground during operation and lift the stalks of corn which may be lying on the ground between the rows. The dividers 41, 41' are mounted at the forward ends of a pair of horizontally disposed frames 42 extending forwardly from the forward end of an inclined harvester frame 43. The harvester frame 43 comprises a pair of laterally spaced structural angle members 44 interconnected at their lower ends by a transverse cutter bar supporting plate 45 and extending upwardly and rearwardly therefrom in substantially parallel arrangement. Transverse angle members 46 interconnect the longitudinal members 44 and the rear ends of the latter are carried on journal bearings 47 (see Figure 2) on a transverse shaft 48 which is journaled on the feeder unit 36, the latter being rigidly mounted on the transverse frame beam 5. Thus, the frame 43 is swingable vertically about the transverse axis of the shaft 48 to raise and lower the divider points 41 relative to the ground. This raising and lowering action is accomplished through a hand crank 49 on the forward end of a rod 50, which is rotatably supported in a bracket 54 on the forward end of the frame 7, as shown in Figure 1. The rear end of the adjusting rod 50 is connected through suitable mechanism, which is shown in some detail in the above-mentioned Hill patent but which is not a part of the present invention. This mechanism acts through a push rod 51, pivotally connected at 52 to the lower end of the frame 43, to swing the latter vertically about the axis of the shaft 48.

Extending upwardly and rearwardly from the divider points 41, 41' is a pair of sheet metal gatherer shields 55, 55' defining a pair of side walls converging inwardly and rearwardly from the dividers 41, 41' and turning rearwardly in longitudinally extending planes to form the upper portion of a longitudinally extending passageway 56. The tops of the shields 55, 55' turn outwardly from the side walls and are substantially flat on top and incline upwardly and rearwardly to form a support for the fallen stalks that are raised by the gatherers 40. Each of the gatherer shields 55, 55' is carried on a tubular support intermediate the ends of the shields, the supports 57, 57' being inclined downwardly and rearwardly substantially perpendicular to the top surface of the shields 55, 55'. The lower end of each support 57, 57' is attached to bottom structure including a pair of members or shelves 60, 60' each in the form of a board disposed generally parallel to the frame 43 of the harvester unit and supported thereon on a pair of longitudinally spaced brackets 61, 61' mounted on the transversely disposed frame angles 46. The brackets 61, 61' as best shown in Figure 4, comprise straps having their ends bent downwardly and inwardly, the inwardly turned portions of the strap being secured by bolts 62 to the transverse frame member 46. A butt receiving channel, defined by the inner edges of the shelves 60, 60' and a butt pan or bottom member 63, is mounted centrally on the transverse members 46 and is inclined upwardly and rearwardly from the cutter bar support 45 to the upper end of the frame 43. The butt pan 63 may be spoken of as another member or component of the bottom structure of which the shelves 60 and 60' form parts. A sickle 65 is reciprocable transversely between a pair of stationary knives 66 and is driven by suitable means (not shown) for severing the cornstalks from the field.

The stalks are moved upwardly and rearwardly along the inclined butt pan 63 by means of a pair of upper and lower gatherer chains 70, 70', 71, 71', on each of the gatherers 40, 40'. Each of the lower chains 71, 71' is disposed on top of the associated shelves 60, 60' and the two lower chains 71, 71' operate in a common plane which extends upwardly and rearwardly parallel to the shelves 60, 60' and the frame 43, and therefore parallel to the butt pan 63. The chains 70, 70', 71, 71', are each of the continuous or endless type and have outwardly extending stalk engaging fingers 72. The inner flights of the two lower chains 71, 71' are adapted to travel upwardly and rearwardly on opposite sides of the butt pan 63, with their stalk engaging fingers 72 extending over the butt pan and terminating closely adjacent each other over the center of the butt pan. The forward ends of the lower chains 71, 71' are trained around idler sprockets 74, which are rotatably mounted at the lower or forward end of the associated shelf 60, 60' in transverse alignment with the sickle 65. The upper ends of the lower gatherer chains 71, 71' are trained around upper idler sprockets 75, which are rotatably mounted at the upper end of the inclined shelf 60. The lower chains 71, 71' are driven by drive sprockets 76, 76' disposed on top of the shelves 60, 60' in the plane of operation of the associated chains 71, 71' and each of the drive sprockets 76, 76' is of considerably larger diameter than the two idler sprockets 74, 75 on opposite sides of the drive sprockets 76, 76', with the result that both the inner and the outer flights of the lower chains 71, 71' engage the drive sprockets on opposite portions of its periphery. The drive sprockets 76, 76' are fixed to hubs 77 which are rigidly mounted on a drive shaft 78, which is supported near its lower end in a bearing 79 carried on the frame 43.

Above the lower chains 71, 71' are disposed a second pair of shelves 80, 80' spaced above the shelves 60, 60' to form slots therebetween adapted to receive the lower chains 71, 71'. The shelves 80, 80' are supported at their forward ends on the horizontal gatherer frame members 42 and at their upper ends on brackets 81 (see Figure 2) mounted on the shelves 60, 60' between the drive sprockets 76, 76' and the upper idler sprockets 75, respectively.

Each of the upper chains 70, 70' is disposed on top of a shelf 83, 83' on its respective gatherer 40, 40'. Each shelf 83, 83' is mounted at its forward and lower end at the forward end of the respective gatherer frame member 42 immediately behind the divider point 41 and extends upwardly and rearwardly therefrom, parallel to the frame 43 of the harvester unit. The rear end of the shelf 83 is carried on a plate or flange 84 which is fixed to the tubular support 57 and also on a bracing member 85 (see Figure 2), which extends rearwardly and is fixed to the frame 43 near the pivoted end of the latter. The forward ends of the continuous chains 70, 70' are trained around idler sprockets 87, 87' which are rotatably mounted on the shelves 83, 83' just rearwardly of the dividers 41, 41'. The inner flights of the chains 70, 70' are trained around idler rollers 88, 88' mounted on the shelves 83, 83', the inner flights of the two upper chains 70, 70' thus being guided inwardly and upwardly and rearwardly in converging relation to bring the cornstalks into the passage 56. The inner flights of the chains 70, 70' extend rearwardly in substantially parallel arrangement through the stalk passage 56 and are trained at their rear ends around a pair of drive sprockets 89, 89', which are mounted on the drive shafts 78, the latter being extended upwardly and forwardly from the lower sprockets 76, 76' and are supported at their upper ends in suitable bearings mounted on the shelves 83, 83', respectively. The upper drive sprockets 89, 89' are comparatively large in diameter, preferably substantially the same diameter as the lower drive sprockets 76, 76' for training the upper chains so that the tubular supports 57 are respectively between opposite runs or flights of the chains. The inner flights of the upper chains 70, 70' bear against shoulders in the form of bars 90, 90' fixed to the shelves 83, 83', for the purpose of holding the chains in engagement with the stalks in the stalk passage 56. A pair of flanges or shelves 91, 91' are fixed to the gatherer shields 55, 55' along the walls thereof within the passage 56, over the upper chains 70.

A pair of side members or walls 92, 92' are vertically disposed in laterally spaced arrangement on opposite sides of the bottom member or butt pan 63 between the upper and lower chains 70, 70', 71, 71' of each gatherer unit 40, 40'. The forward portions 93 of the side walls 92, 92' are carried on the horizontal frame members 42, respectively, and converge inwardly and rearwardly toward the stalk passage 56, where the side walls 92, 92' extend rearwardly in substantially parallel arrangement. As best shown in Figure 4, the side wall 92 is spaced laterally to the left (as viewed in the figure), or toward the outside of the unit 35, and is thus to the left of the inner flight of the chain 70. Similarly, the wall 92' is spaced outwardly to the right (as viewed in the figure) of the inner flight of the chain 70'. By the same token, these walls are respectively offset outwardly from the inner edges of the shelves 60, 60' and 83, 83'. Thus, while the inner flights of the chains and the inner edges of the shelves 60, 60' are disposed sufficiently close together to maintain adequate control of the cornstalks as they are moved upwardly and rearwardly through the passage 56, with the ends of the stalk-engaging fingers 72 nearly in contact with each other, the side walls 92, 92' in the lower part of the stalk passage are spaced appreciably farther apart, in order to provide ample room for the passage of foliage and ears of corn on the stalks.

At the rear end of the stalk passage 56, the side sheets 92, 92' are turned outwardly to form an enlarged stalk receiving space, indicated by reference numeral 95, the side walls of which are respectively approximately in longitudinal alignment with the divider points 41, 41', the side walls being indicated by reference numeral 96, 96'. A transverse wall 97 forms the rear limit to the enclosure 95. It will be noted that while the lower gatherer chains 71 extend to the rear end of the space 95, the upper chains 70 turn outwardly around the drive sprockets 89, 89' thereby disengaging the cornstalks at the front wall of the enlarged space 95. The flanges or shelves 91, 91' above the upper chains 70, 70' extend rearwardly over the ends of the fingers 72 as they turn outwardly around the drive sprocket 89 to cover the fingers in this position, as indicated at 94, thereby serving to assist in disengaging the fingers 72 from the stalks of corn as the latter are discharged into the enlarged space 95. Similarly, the rear ends of the shelves 80, 80' project over the fingers 72 of the lower chains 71, 71' as they turn outwardly around the rear idler sprockets 75, as indicated by reference numeral 94' in Figure 3.

A stalk engaging roll 100 is disposed transversely at the rear end of the frame 43 with its upper portion substantially in alignment with the rear end of the butt pan 63 and is mounted on the shaft 48 for rotation therewith. The roll 100 is provided with outwardly extending axial blades 101, between which are secured a plurality of wooden bars 102 which are slightly thinner than the length of the blades 101, permitting the latter to extend outwardly beyond the faces of the bars 102. This construction has been found to provide approximately the proper amount of frictional engagement with the ends of the stalks delivered to the roll 100 from the butt pan 63 by the fingers 72 of the lower chains 71. However, under some crop conditions, it has been found that a more aggressive action is necessary, which can be obtained by removing the bars 102 from the roll 100.

The feeder unit 36 also includes a housing 104, which is rigidly attached to the cutter housing 21 and has a cylindrically curved upper wall portion 105 which encloses an upper feed roll 106. The roll 106 has a plurality of axially extending radial blades 107. The front edge of the wall is rolled upwardly at 108 to provide a smooth surface against which the cornstalks may be fed into the feeder mechanism 36. A pair of upper and lower feed rolls 110, 111 are disposed within the feeder unit 36 behind the roll 100, the lower roll 111 being mounted on a shaft 112 which is journaled in fixed position in the feeder unit 36, while the upper roll 110 is mounted on a shaft 113 which is vertically shiftable within slots 114 in the side walls, as described in the aforementioned patent to Hill. A plate or table 115 bridges the space between the rolls 100 and 111.

The drive shafts 78 for driving the upper and lower chains 70, 70', 71, 71' are each extended downwardly below the harvester frame 43 and are provided with a bevel gear 116 on each of the shafts 78. The bevel gears 116 mesh with cooperative bevel gears 117 on a transverse shaft 118 supported below the frame 43, the shaft 118 being driven through a sprocket 119 by means of a drive chain 120 which engages a sprocket 121 mounted on a power shaft 122. The power shaft 122 is driven by suitable means (not shown) from the transverse power shaft 33. The shaft 48 on which the feeder roll 100 is mounted is also driven from the shaft 33 by suitable means (not shown).

During operation, the hitch device 15 is pivotally connected to a tractor drawbar and the implement is drawn forwardly in the field with the harvester unit 35 disposed in offset relation to the tractor, and centered on a row of corn. The stalks are cut by the sickle 65 and are gathered into the stalk passage 56 by the chains 70, 70', 71, 71', the butt ends of the stalks sliding upwardly along the butt pan 63 into the enlarged space 95. The stalks are then delivered outwardly toward one side or the other by the chains, while the butt ends of the stalks are carried rearwardly and delivered to the roller 100, which carries the stalks over the table 115 to the feed rolls 110, 111. The upper roller 106 engages the tops of the stalks and serves to urge the latter rearwardly, butt end first, into the feed rolls 110, 111. The flywheel and cutter bar (not shown) are disposed closely adjacent the feed rolls 110, 111 and receive the stalks from the latter.

It will be noted that by virtue of the offset lower walls 92, the leaves and ears are not compressed tightly together with the result that there is very little interference between the leaves and ears of the various stalks as the latter are pulled endwise into the feeding unit 36. I have found that this greatly facilitates the feeding of the stalks with much less trouble from clogging and tangling than in devices heretofore known to those skilled in the art. The crop is chopped to small pieces suitable for ensilage by means of the flywheel chopper 20 and discharged by centrifugal force through an upwardly and rearwardly inclined discharge duct 125 which leads to a wagon towed behind the implement.

I claim:

1. In a harvester for gathering plants such as corn which includes an upright stalk that is foliaged substantially throughout its height except for a lower or butt end that is generally free of foliage, the improvement residing in mechanism for moving along in upright fashion such stalks as have been previously separated from the ground, comprising: upright side structures defining a passage along which such stalks may be moved; a bottom structure below and in vertical alinement with the passage and having portions comparatively closely spaced apart crosswise of the passage for guiding the butt ends of the stalks; said side structures including intermediate portions extending upwardly from the bottom structure to such height and being spaced apart crosswise of the passage such distance greater than the spacing of the bottom structure portions as to accommodate at least the foliaged intermediate parts of the stalks; said side structures further having upper portions comparatively closely spaced apart crosswise of the passage a distance appreciably less than the spacing between said intermediate portions of the side structures for confining upper parts of the stalks; and means for engaging the stalks to move them along the passage.

2. The invention defined in claim 1, further characterized in that: the last named means comprises upper and lower stalk-conveying elements operative lengthwise of the passage and confined respectively to those portions of the passage defined by the bottom structure and the upper portions of the side structures.

3. The invention defined in claim 2, further characterized in that: means is provided substantially at the junction of the intermediate and upper portions of the side structure for supporting the upper stalk-conveying element; and means is provided substantially at the junction of the side structure and the bottom structure for supporting the lower stalk-conveying element.

MILES H. TUFT.

REFERENCES CITED

The following references are of record in the file of this patent:

UNITED STATES PATENTS

| Number | Name | Date |
|---|---|---|
| 435,238 | McCollister et al. | Aug. 26, 1890 |
| 747,507 | Thach | Dec. 22, 1903 |
| 867,215 | Sharp | Sept. 24, 1907 |
| 879,404 | McInturf et al. | Feb. 18, 1908 |
| 1,176,276 | Clay | Mar. 21, 1916 |
| 1,256,683 | Gray | Feb. 19, 1918 |
| 1,462,765 | Miller | July 24, 1923 |
| 1,699,252 | Ronning et al. | Jan. 15, 1929 |
| 1,722,717 | Trottman | July 30, 1929 |